(12) United States Patent
Khan et al.

(10) Patent No.: US 7,800,687 B2
(45) Date of Patent: Sep. 21, 2010

(54) SECURE ACCESS CAMERA AND METHOD FOR CAMERA CONTROL

(76) Inventors: Sal Khan, 6546 Princiotta, Greely, ON (CA) K1A 0R6; Shahid Khan, 218 Street, 7, 1-9 Industrial Area, Islamabad (PA); Martin D. Levine, 19 Church Avenue, Westmount, Quebec (CA)

( * ) Notice: Subject to any disclaimer, the term of this patent is extended or adjusted under 35 U.S.C. 154(b) by 275 days.

(21) Appl. No.: 11/754,849

(22) Filed: May 29, 2007

(65) Prior Publication Data
US 2008/0062278 A1    Mar. 13, 2008

Related U.S. Application Data

(62) Division of application No. 10/141,790, filed on May 8, 2002, now abandoned.

(51) Int. Cl.
*H04N 5/235* (2006.01)
*H04N 9/47* (2006.01)
(52) U.S. Cl. .................................. 348/362; 348/77
(58) Field of Classification Search .............. 348/229.1, 348/77, 78, 156, 362; 382/115, 118
See application file for complete search history.

(56) References Cited

U.S. PATENT DOCUMENTS

| | | | | |
|---|---|---|---|---|
| 5,644,427 A | * | 7/1997 | Omori et al. | 359/464 |
| 5,717,522 A | * | 2/1998 | Hattori et al. | 359/465 |
| 5,793,341 A | * | 8/1998 | Omori et al. | 345/8 |
| 5,818,399 A | * | 10/1998 | Omori et al. | 345/8 |
| 5,976,017 A | * | 11/1999 | Omori et al. | 463/32 |
| 6,128,398 A | * | 10/2000 | Kuperstein et al. | 382/118 |
| 6,266,082 B1 | * | 7/2001 | Yonezawa et al. | 348/159 |
| 6,356,357 B1 | * | 3/2002 | Anderson et al. | 358/1.17 |
| 6,483,539 B1 | * | 11/2002 | Yamagishi | 348/211.6 |
| 6,774,869 B2 | * | 8/2004 | Biocca et al. | 345/8 |
| 7,098,946 B1 | * | 8/2006 | Koseki et al. | 348/229.1 |
| 2002/0080094 A1 | * | 6/2002 | Biocca et al. | 345/8 |

* cited by examiner

*Primary Examiner*—Jason Chan
*Assistant Examiner*—Nicholas G Giles
(74) *Attorney, Agent, or Firm*—Gordon Thomson (57) ABSTRACT

A camera and a method for controlling the camera. Also a face recognition secure access camera and a method of capturing an image that is not saturated or too dark.

15 Claims, 5 Drawing Sheets

SECURE ACCESS CAMERA AND METHOD FOR CAMERA CONTROL

CROSS REFERENCE TO RELATED APPLICATIONS

This is a divisional application from U.S. patent application Ser. No. 10/141,790 filed on May 8, 2002 now abandoned.

FIELD OF THE INVENTION

The present invention relates to a camera and a method for controlling the same and more specifically is concerned with a face recognition secure access camera and a method of capturing an image that is not saturated or too dark.

BACKGROUND OF THE INVENTION

Digital video cameras can be used for restricted area access control, time and attendance recording and computer network access control, video surveillance and other applications requiring personal identification to access entitlements, benefits or a service. These applications are known as "secure access" applications and shall be referred to in that manner throughout this document. Personal identification using a biometric for secure access is an emerging field. The prior art camera apparatus and methods of camera control used in secure access are represented by U.S. Pat. No. 4,423,934 granted on Jan. 3, 1983; U.S. Pat. No. 6,111,517 granted on Aug. 29, 2000; U.S. Pat. No. 5,594,806 granted on Jan. 14, 1997; U.S. Pat. No. 6,188,777 granted on Feb. 13, 2001; and, U.S. Pat. No. 6,172,706 granted on Jan. 9, 2001.

The prior art enabled the use of various biometric parameters such as facial features, knuckle features and iris scans to identify individuals and either grant or deny them access to a restricted place. These systems require the capture of a high fidelity image and the comparison of the captured image with a plurality of stored images. Less than ideal ambient lighting conditions at the time of image capture and movement of the individual being verified often results in the verification process failing due to an inability to match the target image with the stored image. As well, a large amount of memory storage and computing processing power is required to compare a target image with thousands of stored images and can result in several seconds being required per individual using the prior art. This renders the prior art either too slow or totally unable to operate in access control applications where personnel traffic is high.

The disadvantages and limitations associated with the prior art apparatus relate to the fact that they cannot produce a high-fidelity image of the target suitable for biometric comparisons in situations where the ambient lighting is not ideal or varies. The contrast between the background and the target face may cause the target face to be saturated by light or too dark. The prior art apparatus cannot scan the target individual, produce a biometric template and execute a biometric comparison with thousands of stored images fast enough to be of practical use in secure access applications. The prior art apparatus cannot be installed in remote locations as stand-alone units because it requires access to storage media and processing power, neither of which is necessarily available in remote locations.

Secure access applications require an apparatus and method that is capable of rendering a high-fidelity image of the target individual suitable for biometric comparisons using facial recognition where ambient lighting is not ideal or varies. The apparatus must be capable of comparing a target image with either one image in a one-to-one application, or thousands of stored images in a one-to-many application and capable of being installed in remote locations with onboard memory and processing capacity. The camera apparatus must be small enough and inexpensive to manufacture so that it can be installed at a plurality of remote locations. Target scanning and identity verification must take place within one second in order for such apparatus and method to be useful in secure access applications.

SUMMARY OF THE INVENTION

An object of the present invention is to provide an improved camera and camera control for secure access that overcome the deficiencies of the prior art patents.

Another object of the present invention is to provide an improved camera and camera control that is capable of acquiring a high-fidelity target image and rapidly compare that actual image or a coded or transformed version of that image to a single or a plurality of stored images for identify verification.

A further object of the present invention is to provide an improved camera and camera control that has on-board image processing and storage capacity for secure access applications.

Yet another object of the present invention is to provide fast, repeatable, real-time face verification (one-to-one image comparisons) and face recognition (one-to-many image comparisons) in less than ideal or varying illumination conditions.

In accordance with an aspect of the present invention there is provided a camera for capturing a target facial image, the camera comprises a body. An image detector for capturing a target facial image is housed in the body. The image detector has a digital signal output. Alternatively, the image detector may have an analogue output and be connected to an analogue to digital converter. Also housed within the camera body is a video digital signal processor connected to the image detector for processing the digital signal output of the image detector. In another embodiment of the invention there may be a second digital signal processor such as a micro-controller connected to the video digital signal processor for virtually controlling the operation of the camera including pan, tilt, focus and zoom functions. A first memory comprising a permanent flash random access memory is connected to the video digital signal processor for storing a first software program comprising an operating system. In another embodiment of the invention the first memory is connected to the micro-controller when the micro-controller is used to control camera functions. A second memory comprising a removable memory is connected to the video digital signal processor for retrievably storing a plurality of facial images. A second software program is included for comparing the target facial image with the plurality of stored facial images and authenticating the identity of the target facial image.

In a further embodiment of the present invention the image detector is a complementary metal-oxide semi conductor sensor (CMOS) having a YUV output.

In another embodiment of the present invention the image detector has a resolution of at least 640 pixels by 480 pixels and is capable of operation in ambient lighting as low as 100 lumens.

In one embodiment of the present invention the video digital signal processor has at least 32 bits and an operating speed of at least 100 megahertz. The video digital signal processor has a memory port, an input port, an output port and a host port. In still another embodiment of the present invention the camera adjusts image exposure and gain or any other pertinent camera control function, to obtain an acceptable facial image under many different ambient lighting conditions, some very stringent.

In yet another embodiment of the present invention the camera further comprises a video encoder having a video output connection interfaced with the video digital signal processor by way of its output port by means of a direct memory access bus. The video encoder is connected to a remote monitor for viewing of the target image.

In another embodiment of the present invention the first permanent memory means is a flash random access memory connected to the video digital signal processor. Optionally, in another embodiment of the invention, it can be connected to the micro-controller. The operating system is stored in the flash random access memory. In one embodiment of the present invention and upon camera start-up the operating system is loaded from the flash random access memory to the video digital signal processor. In another embodiment of the invention the operating system is loaded into the micro-controller.

In still another embodiment of the present invention the micro-controller and video digital signal processor have universal asynchronous transmitter receivers for connecting to a bit-serial communications network.

In another embodiment of the present invention a control loop automatically adjusts image exposure. The control loop is a software program stored in the camera's flash random access memory.

In one embodiment of the present invention the replaceable memory storage means consists of a random access memory module connected to the video digital signal processor by way of its memory bus. The random access memory module has a capacity of at least 8 mega bytes and is capable of storing a plurality of coded or transformed images.

In another embodiment of the present invention the video digital signal processor is connected to at least one peripheral device chosen from a group of peripheral devices consisting of proximity card readers, magnetic card readers, bar card readers, smart card readers, finger print readers, voice recognition devices, LCD displays, printers and keypads.

Another aspect of the present invention is directed to a method of camera control to capture an image of a face that is not saturated or too dark. This kind of control is useful when the background is of different intensity than the face (darker or brighter). In one embodiment of the present invention several sequential images of the same target are taken using different exposures or gains. These images can then be combined into a single one to produce a much better rendering of the face in spite of the variability of the lighting conditions over the surface.

In still another embodiment of the invention, the control loop is divided into two sub-loops. Each of these sub-loops controls the resulting intensity on one side of the face of the target image. When each control loop has converged for its own side of the face, the views are merged using a technique called "Gamma Correction". This technique has the effect of amplifying the low intensity pixels more than the high-intensity pixels showing more detail in the dark regions of the image. "Gamma Correction" is used to compress the dynamic range of intensities measured by the two acquired images. In this way the measured intensities are made to fit into a standard image in which each pixel's intensity value is represented by 8 bits.

The method of camera control comprises the steps of: providing a camera control loop consisting of a first exposure control loop for a first side of the face of an individual and a second exposure control loop for a second side of the face of an individual; then acquiring a target image; then acquiring the face of the target image; capture a first image of the face of the target; then using the first exposure control loop measuring the average intensity of the pixels on a first side of said face; comparing measured intensity to a predetermined set point; adjusting camera exposure levels so that the measured intensity meets said predetermined set point; capturing a second image of the face; then using the second exposure control loop measuring the average intensity of the pixels on the side of said second image of the face opposite to that measured on the first image; comparing measured intensity to a predetermined set point; adjusting camera exposure levels to said predetermined set point; merge the output of said first and second exposure control loops into one image using an image merging method.

In one embodiment of the present invention camera sensitivity is controlled by first acquiring a first image of a first side of the face of a person and then measuring the intensity on that first side of the face. The average intensity on the first side of the face is estimated. For example, the average intensity may be 115 out of a maximum value of 255. The predetermined set point may be 140. Therefore it is necessary to increase the exposure of the camera to bring the measured intensity to the desired intensity. Alternatively, if the exposure setting of the camera is at maximum then it is necessary to increase the gain of the camera. Due to camera sensitivity it may not be possible to obtain the predetermined set point. Camera sensitivity is a measure of the ability of the camera to achieve the predetermined set point. Camera sensitivity is one factor used to compute the change in exposure or gain necessary to meet the predetermined set point for any given intensity reading. The predetermined set point may be achieved within plus or minus 10 units, that is, between 130 and 150. Therefore, in this example, the difference between the predetermined set point and the measured intensity is 25 units. Camera sensitivity will determine whether or not the exposure should be increased by the full 25 units or some other greater or lesser value. In this embodiment of the present invention the camera will anticipate the reaction of the camera to exposure or gain corrections and provide an estimated correction factor for camera sensitivity. For example, if the camera sensitivity were assumed to be a factor of one and the exposure were increased by 25 units resulting in a new exposure of 155, then the sensitivity of the camera would have to be reduced to bring the exposure value to within tolerance.

Each image for each side of the face is acquired by: measuring the average intensity on the left or on the right of the face for the first or the second image respectively; adjusting the camera settings so as to increase or decrease the intensity on this region of the face; updating the estimate of the camera response sensitivity. If the change in gain of the camera is adjusted to be too high, the control loop will produce unstable image intensity and if it is too low the control will be slow. This parameter is an estimate of the gain of the camera. When the camera response sensitivity is well estimated the new gain and exposure settings of the camera can be determined more precisely.

In another embodiment of the present invention a method of merging the images is provided consisting of the steps of: calculating the average intensity of each pixel of each image by first correcting the intensity of each pixel of the first and second image by an exposure factor, second, summing the intensity of the same pixel of the first and second image and then dividing the summed intensity by two; calculating the maximum averaged intensity of each pixel; dividing the average intensity of each pixel by the maximum averaged intensity of each pixel; applying a compression factor to the quotient.

In yet another embodiment of the present invention gain control is used when camera exposure has been set to its maximum value.

The use of the camera and camera control of the present invention makes it possible to produce a camera for secure access and personal identification applications that can function in less than ideal and varying illumination conditions. The increased speed of image recognition will allow the present invention to be applied in a variety of security, access control and authorized person verification applications.

In yet another aspect of the present invention there is a provision for a method of authorized personnel identity authentication using face recognition and using a camera comprising: a body; an image detector for capturing a target image said image detector having a digital signal output; a video digital signal processor connected to said image detector for camera control and processing said digital signal output wherein said image detector and said digital processor are adjacent to each other and contained in said camera body; a first permanent memory means connected to the video digital signal processor for storing said operating system; a second removable memory means connected to said first digital processor for retrievably storing a plurality of images comprising the steps of:
 a. placing a plurality of cameras at locations where personnel authentication using face recognition is required;
 b. connecting said plurality of cameras in a networked configuration;
 c. connecting said networked configuration to a central processing unit wherein said central processing unit includes a database of a plurality of images of authorized personnel;
 d. capturing the image of an authorized person;
 e. transmitting said image to said central processing unit by the network;
 f. verifying the image as the image of an authorized person.

In still another aspect of the present invention there is provided a method of surveillance of restricted areas using face recognition and using a camera comprising: a body; an image detector for capturing a target image said image detector having a digital signal output; a video digital signal processor connected to said image detector for camera control and processing said digital signal output wherein said image detector and said digital processor are adjacent to each other and contained in said camera body; a first permanent memory means connected to said video digital signal processor for storing said operating system; a second removable memory means connected to said first digital processor for retrievably storing a plurality of images, comprising the steps of:
 a. placing a plurality of cameras at locations where personnel authentication using face recognition is required;
 b. connecting said plurality of cameras in a networked configuration;
 c. connecting said networked configuration to a central processing unit wherein said central processing unit;
 d. capturing the facial image of a person entering the restricted area;
 e. transforming said captured image to a digital format;
 f. indexing the captured image for time and location;
 g. transmitting said image to said central processing unit by the network;
 h. storing the image for subsequent retrieval.

BRIEF DESCRIPTION OF DRAWINGS

The present invention will be further understood from the following description with references to the drawings in which.

DETAILED DESCRIPTION

Figure 1:
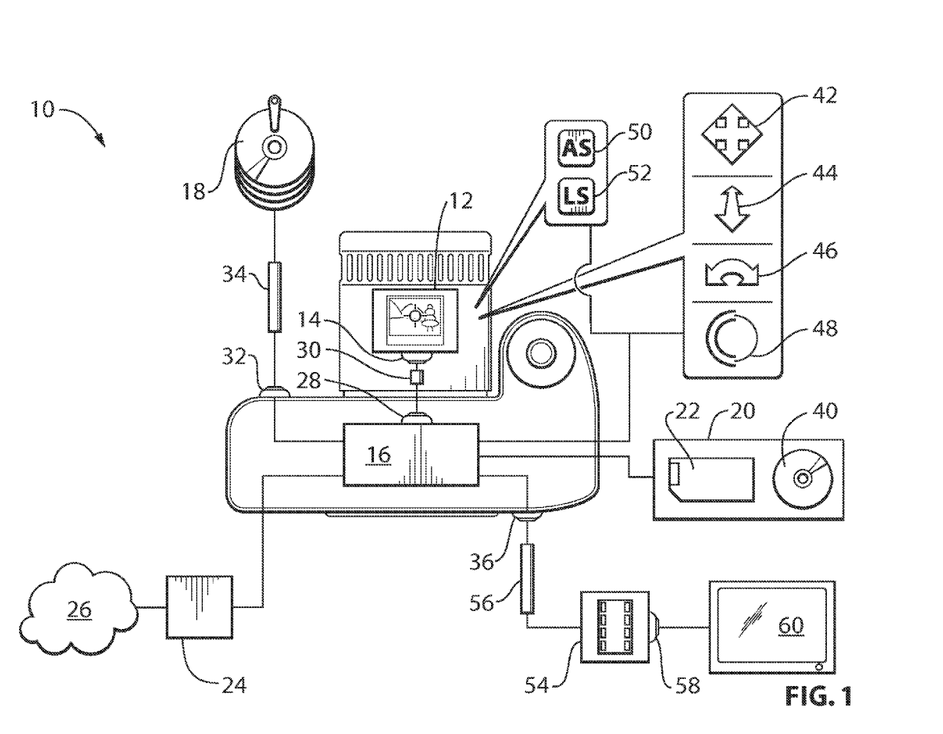
FIG. 1 illustrates in block diagram form a camera in accordance with one embodiment of the present invention.

Referring to FIG. 1 there is illustrated in block diagram form a camera in accordance with one embodiment of the present invention. The camera (10) includes an image detector (12) having a digital signal output (14), a video digital signal processor (16), a first memory comprising a flash random access memory (20) for storing an operating system, and a second memory comprising a removable memory (18) for storing a plurality of facial images. Upon camera start-up the operating system (22) is downloaded to the video digital signal processor (16). The video digital signal processor (16) has a universal asynchronous transmitter receiver (24) for connecting to a bit-serial communications network (26).

The image detector (12) is a complementary metal-oxide semi conductor sensor (CMOS) having a YUV output (14) and is connected to the video digital signal processor (16) from the YUV output (14) of the image detector to the left input (28) of the video digital signal processor by way of direct memory access bus (30). Memory (18) is connected to the video digital signal processor memory port (32) by way of memory bus (34). Memory (18) has at least a capacity of 8 mega bites and is capable of storing a large number of transformed or coded images. The video digital signal processor has at least 32 bits and operates at a speed of at least 100 megahertz and has a memory port (32), a left input port (28), a right output port (36) and a host port (38). The camera includes software (40) for adjusting image exposure and gain, and tracking the image across a visual field. The video digital signal processor (16) operates a variety of camera control functions including pan (42), zoom (44), tilt (46) and focus (48). Analogue sensors (50) and limit sensors (52) provide input to the video digital signal processor for camera control. A video encoder (54) is connected to the right output port (36) of the video digital signal processor (16) by way of direct memory access bus (56). The video out connection (58) of the video encoder (54) is connected to a monitor (60) for remote viewing of the target image.

Figure 2:
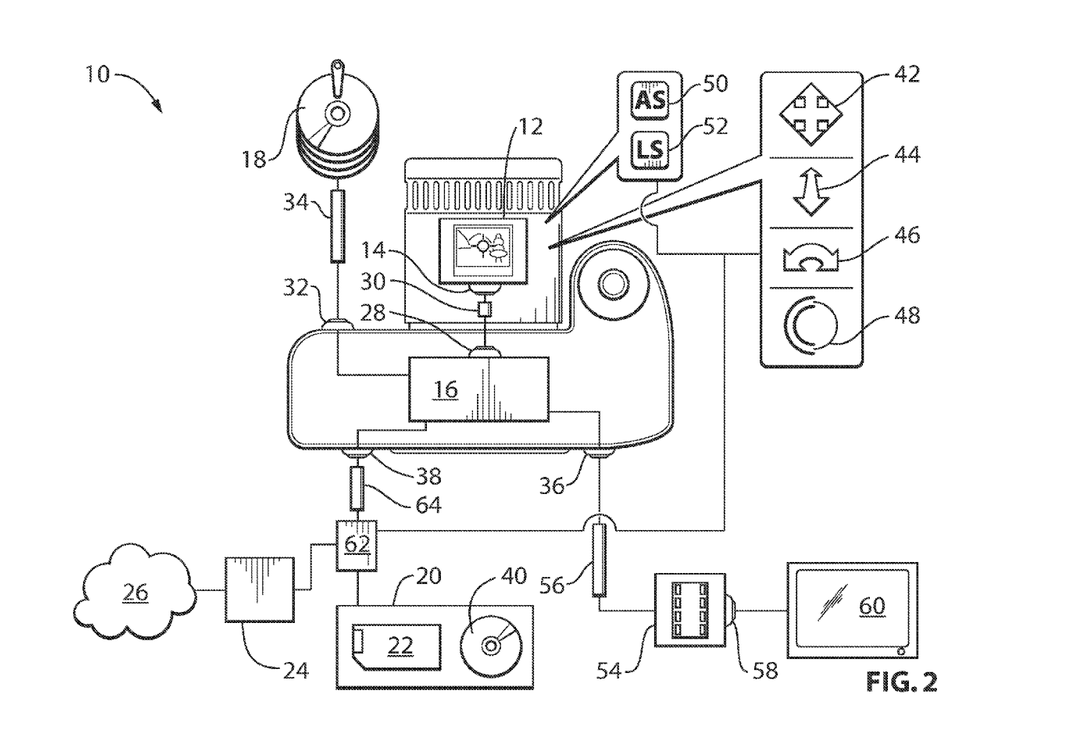
FIG. 2 illustrates in block diagram form a camera in accordance with another embodiment of the present invention.

Referring to FIG. 2 there is shown a block diagram of another embodiment of the present invention. Micro-controller (62) is connected to the video digital signal processor (16) from host port (38) on the video digital signal processor by way of bus (64). Micro-controller (62) controls camera pan (42), tilt (44), focus (46) and zoom (48) functions using limit sensors (52) and analogue sensors (50). Flash memory (20) is connected to micro-controller (62) and stores operating system software (22) and camera control software (40). Micro-controller (62) is connected to a universal asynchronous transmitter receiver (24) for connecting to a bit-serial communications network (26)

Image detector (12) has a resolution of at least 640 pixels by 480 pixels and is capable of operation in ambient lighting as low as 100 lumens.

Figure 3:
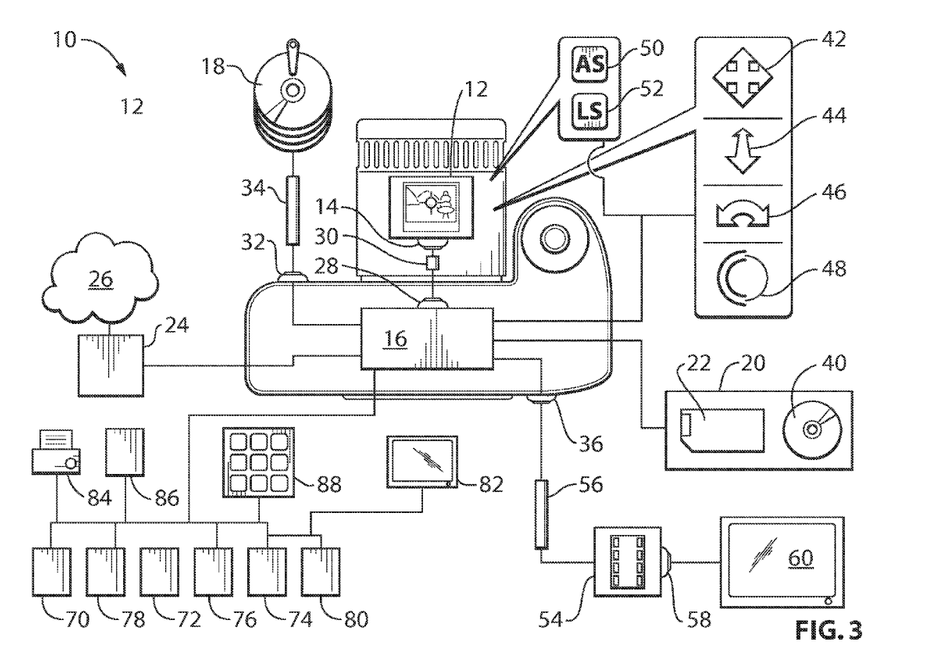
FIG. 3 illustrates in block diagram form a camera in accordance with yet another embodiment of the present invention.

Referring to FIG. 3 there is shown in block diagram format yet another embodiment of the present invention. The video digital signal processor (16) is connected to at least one peripheral device chosen from a group of peripheral devices consisting of a proximity card reader (70), a magnetic card reader (72), a bar card reader (74), a smart card readers (76), a finger print reader (78), a voice recognition device (80), a LCD display (82), a printer (84) and a keypad (88).

Figure 4:
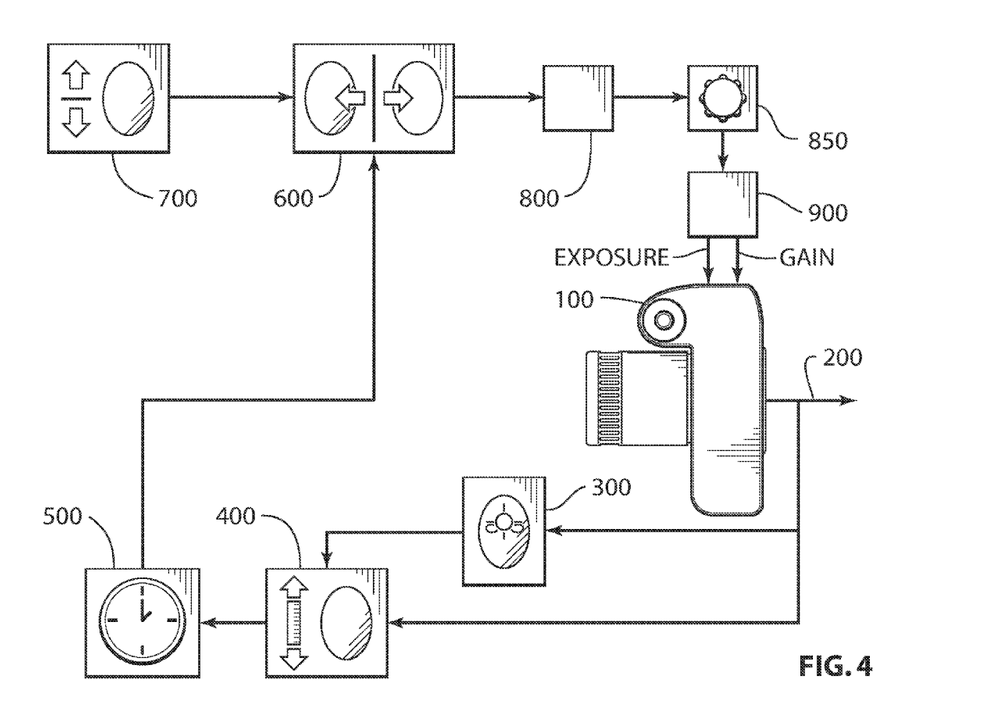
FIG. 4 illustrates in block diagram form a camera control loop in accordance with one embodiment of the present invention.

Referring to FIG. 4, there is illustrated a control loop in block diagram form of one embodiment of the present invention. Camera (100) is used to acquire a target image and produces video stream (200). Imaging software (300) acquires the face of the target image and captures a first image of the face. As represented by block (400) the average intensity of each pixel on a first side of said face is measured. As represented by block (500) there is a time delay in the order of several milliseconds for the average intensity on the side of the face to be estimated. A comparator (600) compares the estimated intensity with a predetermined set point intensity (700). As represented by block (800) an adjustment to camera exposure is calculated based on the difference between the measured average intensity on the first side of the face and the predetermined set point. As represented by block (850) a new camera exposure level is calculated. Then as represented by block (900) the camera settings are adjusted to the new exposure level. The process is repeated until the average intensity meets the predetermined set point within plus or minus about 10 units.

Figure 5:
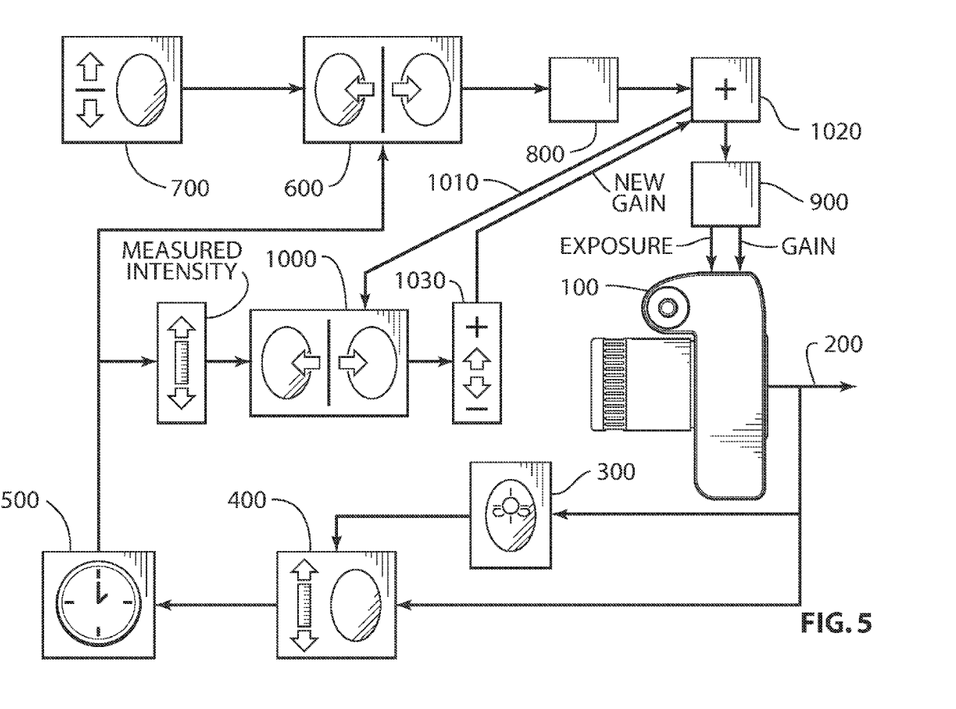
FIG. 5 illustrates in block diagram form a camera control loop in accordance with yet another embodiment of the present invention.

Referring to FIG. 5 there is shown in block diagram format a control loop in accordance with another embodiment of the invention. If the exposure setting of the camera is at a maximum value then it will be necessary to increase the gain on the camera. The measured average exposure intensity is compared by comparator (1000) with a predicted exposure intensity (1010) based on the current gain (1020) of the camera. As represented by block (1030) where camera exposure is already at a maximum a new gain value is calculated in order to obtain the desired exposure. The new gain value is used to adjust the camera settings (900). The process is repeated until the average intensity meets the predetermined set point within plus or minus about 10 units.

Referring to FIGS. 4 and 5, the process is repeated for the opposite side the face of the captured image.

The first and second images are then merged into one image using an image merging method. The method of merging the two images can be explained by reference to the following formulae and explanation:

$$\bar{I}_p = \Sigma[(I_{ip}/Expo_i)]/2 \qquad \text{Formula 1}$$

$$I_{merged} = (\bar{I}_p/\bar{I}_{max})^{0.66} \qquad \text{Formula 2}$$

Where:
$I_{ip}$ is the intensity on image (i) pixel (p)
$Expo_i$ is the exposure used for image (i)
$\bar{I}_p$ is the averaged intensity on pixel (p)
$\bar{I}_{max}$ is the maximum averaged intensity
$I_{merged}$ is the averaged image after dynamic range compression using "Gamma Correction".

In Formula (1) the intensity of each pixel is first averaged by taking into consideration the exposure used to acquire the corresponding image. For example, this equation expresses the fact that a bright pixel taken at high exposure is equivalent to a dark pixel taken at low exposure. This equation provides a way to average the intensities in the two images. Other algorithms for this function are also possible.

Formula (2) is used to compress the dynamic range of the resulting averaged image. Such an image does not fit into a regular 8-bit image. It needs to be "compressed". The kind of compression applied by equation (2) has the effect of giving more range to the dark regions and less to the bright ones. The resulting image is usually more pleasing to the eye and tends to expose the small details hidden within the dark regions. Other algorithms for this function are also possible.

Numerous modifications, variations, and adaptations may be made to the particular embodiments of the invention described above without departing from the scope of the invention that is defined in the claims.

What is claimed is:

1. A video camera comprising:
   a. an image detector for capturing a target facial image from a video stream comprising a series of human facial images;
   b. a first software program in communication with said image detector for controlling the operation of the image detector in respect of at least tilt, pan, zoom and focus of said target facial image;
   c. a first memory device connected to a digital signal processor for retrievable storage of said first software program;
   d. said digital signal processor connected to the image detector for digitizing the target facial image as a digitized first half target facial image and a digitized second half target facial image;
   e. a second memory device connected to the digital signal processor for retrievable storage of said digitized first half target facial image and said digitized second half target facial image; and,
   f. a second software program in communication with said second memory device, said second software program comprising:
      i. a software control loop for exposure correction of the digitized first half target facial image into an exposure corrected digitized first half target facial image and for exposure correction of the digitized second half target facial image into an exposure corrected digitized second half target facial image; and,
      ii. means for merging said exposure corrected digitized first half target facial image and said exposure corrected digitized second half target facial image into an exposure corrected digitized target facial image.

2. The video camera of claim 1 wherein said exposure corrected digitized target facial image is further processed by a facial recognition software program in communication with the image detector for authentication of the exposure corrected digitized target facial image.

3. The video camera of claim 2 wherein the video camera is further connected to a video display terminal for display of the exposure corrected digitized target facial image.

4. The video camera of claim 3 further comprising a universal asynchronous transmitter/receiver connected to the digital signal processor for connecting to a bit-serial communications network so that said video stream can be transmitted over a computer network to a remote location for facial recognition processing.

5. The video camera of claim 4 wherein said software control loop for exposure correction includes an exposure control loop and a gain control loop, wherein said gain control loop is operative only when said exposure control loop is at a maximum value.

6. The video camera of claim 5 wherein said exposure control loop comprises a first exposure control sub-loop and a second exposure control sub-loop.

7. The video camera of claim 6 wherein said first exposure control sub-loop corrects the digitized first half target facial image and wherein said second exposure control sub-loop corrects the digitized second half target facial image.

8. The video camera of claim 7 wherein the first exposure control sub-loop comprises:
   a. a first set point representing a desired camera exposure, wherein said desired camera exposure is adapted for ambient light conditions;
   b. means for obtaining a first measured camera exposure of each pixel of a first plurality of pixels representing the digitized first half target facial image;
   c. means for calculating a first average camera exposure for the digitized first half target facial image;
   d. a comparator for calculating a first difference value between said first average camera exposure and said desired camera exposure for the digitized first half target facial image;
   e. means for calculating a second camera exposure for the digitized first half target facial image based on said first difference value;
   f. means for adjusting the first measured camera exposure to said second camera exposure; and,
   g. iterative means for repeating steps c to f until the first measured camera exposure for the digitized first half target facial image is at said first set point thereby creating the exposure corrected digitized first half target facial image.

9. The video camera of claim 8 wherein the second exposure control sub-loop comprises:
   a. the first set point representing the desired camera exposure;
   b. means for obtaining a second measured camera exposure of each pixel of a second plurality of pixels representing the digitized second half target facial image;
   c. means for calculating a second average camera exposure for the digitized second half target facial image;
   d. said comparator for calculating a second difference value between said second average camera exposure and the desired camera exposure for the digitized second half target facial image;
   e. means for calculating a third camera exposure for the digitized second half target facial image based on said second difference value;
   f. means for adjusting said second measured camera exposure to said third camera exposure; and,
   g. iterative means for repeating steps c to f until the second measured camera exposure for the digitized second half target facial image is at the first set point thereby creating the exposure corrected digitized second half target facial image.

10. The video camera of claim 9 wherein said means for merging the exposure corrected digitized first half target facial image and the exposure corrected digitized second half target facial images into said exposure corrected digitized target facial image comprises:
    a. means for averaging the first measured camera exposure of the exposure corrected digitized first half target facial image and the second measured camera exposure corrected digitized second half target facial images; and,
    b. a compression factor for compressing the exposure corrected digitized target facial image into an at least 8-bit image.

11. The video camera of claim 10 wherein the means for merging the exposure corrected digitized first half target facial image and the exposure corrected digitized second half target facial images further comprises Gamma Correction.

12. The video camera of claim 11 wherein said gain control loop comprises a first gain control sub-loop and a second gain control sub-loop.

13. The video camera of claim 12, wherein said first gain control sub-loop comprises:
    a. a gain set point representing the desired camera exposure;
    b. means for obtaining a third measured exposure value of each pixel of said first plurality of pixels representing the digitized first half target facial image;
    c. means for calculating a third average exposure intensity of said first plurality of pixels;
    d. the comparator for calculating a third difference value between said third average exposure and the desired exposure;
    e. means for calculating a first gain value based on said third difference value;
    f. means for adjusting the camera to said first gain value; and,
    g. iterative means for repeating steps c to f until the camera gain value is equal to said gain set point thereby creating the exposure corrected digitized first half target facial image.

14. The video camera of claim 13 wherein said second gain control sub-loop comprises:
    a. the gain set point;
    b. means for obtaining a fourth measured exposure value of each pixel of said second plurality of pixels representing the digitized second half target facial image;
    c. means for calculating a fourth average exposure intensity of said second plurality of pixels;
    d. the comparator for calculating a fourth difference value between said fourth average exposure and the desired exposure;
    e. means for calculating a second gain value for the digitized second half target facial image based on said fourth difference value;
    f. means for adjusting the camera to said second gain value; and,
    g. iterative means for repeating steps b to f until the camera gain value for the digitized second half target facial image is equal to the gain set point thereby creating the exposure corrected digitized second half target facial image.

15. The video camera of claim 14 further comprising means for merging said digitized first half exposure corrected target facial image and said digitized second half exposure corrected target facial image into a complete digitized exposure corrected target facial image for subsequent facial recognition processing.

* * * * *